US012205541B2

(12) United States Patent
Liu et al.

(10) Patent No.: US 12,205,541 B2
(45) Date of Patent: Jan. 21, 2025

(54) ARRAY SUBSTRATE AND DISPLAY DEVICE

(71) Applicant: BOE TECHNOLOGY GROUP CO., LTD., Beijing (CN)

(72) Inventors: Libin Liu, Beijing (CN); Jiangnan Lu, Beijing (CN); Shiming Shi, Beijing (CN); Li Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/789,918

(22) PCT Filed: Jun. 29, 2021

(86) PCT No.: PCT/CN2021/103008
§ 371 (c)(1),
(2) Date: Jun. 29, 2022

(87) PCT Pub. No.: WO2023/272476
PCT Pub. Date: Jan. 5, 2023

(65) Prior Publication Data

US 2024/0177662 A1 May 30, 2024

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01);
(Continued)

(58) Field of Classification Search
CPC .................. G09G 3/32; G09G 3/3233; G09G 2300/0426; G09G 2310/0262;
(Continued)

(56) References Cited

U.S. PATENT DOCUMENTS 10,186,567 B2 1/2019 Jeong et al.
10,650,740 B2 5/2020 Mao
(Continued)

FOREIGN PATENT DOCUMENTS

CN 105529351 A 4/2016
CN 107808636 A 3/2018
(Continued)

OTHER PUBLICATIONS

Extended European Search Report issued for EP Application No. 21947438.4, mailed on Apr. 22, 2024, 16 pages.

*Primary Examiner* — Priyank J Shah
(74) *Attorney, Agent, or Firm* — Dave Law Group, LLC; Raj S. Dave

(57) ABSTRACT

An array substrate and a display device are provided. The array substrate includes a plurality of pixel driving circuits, each of which includes a driving transistor, a first light emitting control transistor, a compensation transistor, a first initialization transistor and a second initialization transistor; a first electrode of the first initialization transistor and a first electrode of the first light emitting control transistor are connected to a first node; a first electrode of the second initialization transistor and a first electrode of the compensation transistor are connected to a second node, a second electrode of the first initialization transistor is configured to receive the first initialization signal, and a cathode of the light emitting element is configured to receive a first driving signal, and a difference between a potential of the first initialization signal and a potential of the first driving signal is less than 1.5V.

19 Claims, 9 Drawing Sheets

(52) U.S. Cl.
CPC ............... *G09G 2320/0233* (2013.01); *G09G 2320/0247* (2013.01); *G09G 2320/066* (2013.01)

(58) Field of Classification Search
CPC ..... G09G 2310/0251; G09G 2320/043; G09G 2320/0233; G09G 2320/066
See application file for complete search history.

(56) References Cited

U.S. PATENT DOCUMENTS

| | | | | |
|---|---|---|---|---|
| 11,263,960 | B2 | 3/2022 | Xiong et al. | |
| 11,263,969 | B2 | 3/2022 | Yang et al. | |
| 2017/0270853 | A1 | 9/2017 | Xiang et al. | |
| 2020/0066212 | A1* | 2/2020 | Kim | G09G 3/3233 |
| 2020/0286432 | A1* | 9/2020 | Zhang | G09G 3/3258 |
| 2020/0286972 | A1 | 9/2020 | Seo et al. | |
| 2021/0035499 | A1 | 2/2021 | Qian et al. | |
| 2021/0328002 | A1* | 10/2021 | Lee | H10K 59/80522 |
| 2021/0375198 | A1 | 12/2021 | Zhang et al. | |
| 2022/0059637 | A1* | 2/2022 | Choi | G09G 3/3233 |
| 2022/0149139 | A1* | 5/2022 | Kim | H10K 50/814 |
| 2022/0157238 | A1* | 5/2022 | Wang | G09G 3/3233 |
| 2022/0238616 | A1 | 7/2022 | Lin et al. | |

FOREIGN PATENT DOCUMENTS

| | | | |
|---|---|---|---|
| CN | 109903709 | A | 6/2019 |
| CN | 110517641 | A | 11/2019 |
| CN | 110675816 | A | 1/2020 |
| CN | 111105749 | A | 5/2020 |
| CN | 111489700 | A | 8/2020 |
| CN | 111489701 | A | 8/2020 |
| CN | 111489703 | A | 8/2020 |
| CN | 111508422 | A | 8/2020 |
| CN | 111668263 | A | 9/2020 |
| CN | 112309323 | A | 2/2021 |
| EP | 3098804 | A2 | 11/2016 |
| EP | 3996080 | A1 | 5/2022 |
| WO | 2019112683 | A1 | 6/2019 |

* cited by examiner

100

ARRAY SUBSTRATE AND DISPLAY DEVICE

CROSS-REFERENCE TO RELATED APPLICATIONS

The present application is the U.S. National Stage Entry of PCT/CN2021/103008, filed on Jun. 29, 2021, the entire disclosure of which is incorporated herein by reference as part of the disclosure of this application.

TECHNICAL FIELD

The embodiments of the present disclosure relate to an array substrate and a display device.

BACKGROUND

With the continuous development of display technology, people have higher and higher requirements for the display quality of display devices. Organic light emitting diode (OLED) display devices are widely used because of wide color gamut, fast response, flexible display, flexibility and high contrast.

Because the organic light emitting diode (OLED) display device is driven by current, the OLED display device needs to adopt complex pixel driving circuit, such as 7T1C circuit, to improve the display stability and uniformity of the OLED display device, and to improve the display quality.

SUMMARY

Embodiments of the present disclosure provide an array substrate and a display device. By setting the difference between the potential of the first initialization signal and the potential of the first driving signal to be less than 1.5V, the array substrate can reduce the voltage difference between the anode and cathode of the light emitting element when initializing the anode of the light emitting element, so that the charge on the anode of the light emitting element can be quickly discharged, and the light emitting element can be turned off completely, so that the problems of stroboscopic and uneven brightness in low gray scale can be alleviated, and the contrast can be improved. In addition, the first initialization signal and the second initialization signal of the array substrate can be transmitted by different initialization signal lines, thereby reducing the load on a single initialization signal line, reducing the voltage drop on a single initialization signal line, and further improving the brightness uniformity.

At least one embodiment of the present disclosure provides an array substrate, which includes: a base substrate; and a plurality of pixel driving circuits, arranged in an array on the base substrate, each of the pixel driving circuits includes a driving transistor, a first light emitting control transistor, a compensation transistor, a first initialization transistor and a second initialization transistor, a first electrode of the first initialization transistor and a first electrode of the first light emitting control transistor are connected to a first node, and the first initialization transistor is configured to provide a first initialization signal to an anode of a light emitting element through the first node, a first electrode of the second initialization transistor and a first electrode of the compensation transistor are connected to a second node, and the second initialization transistor is configured to provide a second initialization signal to a gate electrode of the driving transistor through the second node, a second electrode of the first initialization transistor is configured to receive the first initialization signal, and a cathode of the light emitting element is configured to receive a first driving signal, and a difference between a potential of the first initialization signal and a potential of the first driving signal is less than 1.5V.

For example, in the array substrate provided by an embodiment of the present disclosure, the potential of the first initialization signal and a potential of the second initialization signal are different.

For example, in the array substrate provided by an embodiment of the present disclosure, the potential of the first initialization signal and the potential of the first driving signal are the same.

For example, the array substrate provided by an embodiment of the present disclosure further includes: a first initialization signal line, extending in a first direction and connected to the second electrode of the first initialization transistor to apply the first initialization signal to the second electrode of the first initialization transistor; a second initialization signal line, extending in the first direction and connected to the second electrode of the second initialization transistor to apply the second initialization signal to the second electrode of the second initialization transistor; the light emitting element including the anode and the cathode; and a first power line, the anode of the light emitting element is electrically connected with the first node, and the first initialization signal line is electrically connected with the first power line or the cathode of the light emitting element.

For example, in the array substrate provided by an embodiment of the present disclosure, the base substrate includes a display region and a peripheral region around the display region, the pixel driving circuit and the light emitting element are located in the display region, and the first power line is located in the peripheral region, the array substrate further includes: a first connection line, located in the peripheral region; and a second connection line, is located in the peripheral region, the first initialization line extends from the display region to the peripheral region and is connected with the first connection line, one end of the second connection line is connected with the first power line, and the other end of the second connection line is connected with the first connection line.

For example, in the array substrate provided by an embodiment of the present disclosure, the first connection line includes: a first sub-connection portion, extending in a second direction intersecting the first direction; a second sub-connection portion, extending in the second direction; and a third sub-connection portion, extending in the first direction, one end of the third sub-connection portion is electrically connected with the first sub-connection portion, and the other end of the third sub-connection portion is electrically connected with the second sub-connection portion, the first sub-connection portion is located at a first side of the display region in the first direction, the second sub-connection portion is located at a second side of the display region opposite to the first side in the first direction, and the third sub-connection portion is located at a side of the display region in the second direction, one end of the first initialization line is electrically connected with the first sub-connection portion, and the other end of the first initialization line is electrically connected with the second sub-connection portion.

For example, in the array substrate provided by an embodiment of the present disclosure, the plurality of pixel driving circuits form a plurality of pixel driving rows, each of the pixel driving rows includes multiple pixel driving circuits arranged in the first direction, the plurality of pixel driving rows are arranged in a second direction intersecting the first direction, a plurality of first initialization signal lines are provided, and the plurality of first initialization signal lines are configured to apply first initialization signals to the plurality of pixel driving rows, the array substrate further includes at least one interconnection line which extends in the second direction and is connected with the plurality of the first initialization signal lines.

For example, in the array substrate provided by an embodiment of the present disclosure, the plurality of pixel driving circuits form a plurality of pixel driving columns, each of the pixel driving columns includes multiple pixel driving circuits arranged in the second direction, and the plurality of pixel driving columns are arranged in the first direction, the array substrate includes a plurality of second power lines, and the plurality of second power lines are arranged corresponding to the plurality of pixel driving columns; in a region corresponding to one pixel driving circuit, an overlapping area of an orthographic projection of the second power line on the base substrate and an orthographic projection of the interconnection line on the base substrate is less than 50% of an area of the orthographic projection of the interconnection line on the base substrate.

For example, in the array substrate provided by an embodiment of the present disclosure, the base substrate includes a display region and a peripheral region around the display region, the pixel driving circuit and the light emitting element are located in the display region, and the first power line is located in the peripheral region, the first initialization line extends from the display region to the peripheral region and is directly connected with the first power line.

For example, in the array substrate provided by an embodiment of the present disclosure, the plurality of pixel driving circuits form a plurality of pixel driving rows, each of the pixel driving rows includes multiple pixel driving circuits arranged in the first direction, the plurality of pixel driving rows are arranged in a second direction intersecting the first direction, a plurality of first initialization signal lines are provided, and the plurality of first initialization signal lines are configured to apply first initialization signals to the plurality of pixel driving rows, the array substrate further includes at least one interconnection line which extends in the second direction and is connected with the plurality of the first initialization signal lines.

For example, in the array substrate provided by an embodiment of the present disclosure, each of the pixel driving circuits further includes a second light emitting control transistor, a storage capacitor and a data writing transistor, the array substrate further includes a second power line, a data line, a first light emitting control line, a gate line and a reset signal line, a first electrode of the driving transistor, a second electrode of the first light emitting control transistor and a second electrode of the compensation transistor are connected to a third node, the gate electrode of the driving transistor is connected to a first electrode plate of the storage capacitor, a second electrode of the driving transistor, a first electrode of the data writing transistor and a first electrode of the second light emitting control transistor are connected to a fourth node, a gate electrode of the first initialization transistor and a gate electrode of the second initialization transistor are respectively connected with reset signal lines of two adjacent rows, the second electrode of the data writing transistor is connected with the data line, the gate electrode of the data writing transistor and the gate electrode of the compensation transistor are respectively connected with the gate line, the second electrode of the second light emitting control transistor and the second electrode plate of the storage capacitor are respectively connected with the second power line, and the gate electrode of the first light emitting control transistor and the gate electrode of the second light emitting control transistor are respectively connected with the second power line.

For example, in the array substrate provided by an embodiment of the present disclosure, each of the pixel driving circuits further includes: an anti-leakage transistor, a first electrode of the anti-leakage transistor is electrically connected with the gate electrode of the driving transistor, and a second electrode of the anti-leakage transistor is connected to the second node.

For example, in the array substrate provided by an embodiment of the present disclosure, a material of an active layer of the anti-leakage transistor includes an oxide semiconductor material.

For example, in the array substrate provided by an embodiment of the present disclosure, materials of an active layer of the first light emitting control transistor, an active layer of the second light emitting control transistor, an active layer of the compensation transistor, an active layer of the first initialization transistor, an active layer of the second initialization transistor, an active layer of the driving transistor and an active layer of the data writing transistor include silicon-based semiconductor materials.

For example, the array substrate provided by an embodiment of the present disclosure further includes: a second gate line, a gate electrode of the anti-leakage transistor being connected with the second gate line, the active layer of the anti-leakage transistor is located on a side of the second electrode plate away from the base substrate, and the first initialization line and the second gate line are arranged on a same layer and are located on a side of the active layer of the anti-leakage transistor away from the base substrate.

For example, in the array substrate provided by an embodiment of the present disclosure, the gate electrode of the driving transistor is connected to the second node, and the second initialization transistor is configured to provide the second initialization signal to the gate electrode of the driving transistor through the second node.

For example, in the array substrate provided by an embodiment of the present disclosure, the first initialization signal line and the reset signal line at least partially do not overlap.

For example, in the array substrate provided by an embodiment of the present disclosure, in a direction perpendicular to the base substrate, the first initialization signal line is located between the reset signal line and the second initialization signal line.

For example, in the array substrate provided by an embodiment of the present disclosure, the first initialization signal line is electrically connected to the second electrode of the first initialization transistor through a connection block, and the connection block is located on a side of the first initialization signal line away from the base substrate.

At least one embodiment of the present disclosure further provides a display device, including any one of the above-mentioned array substrate.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components.

The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or a mechanical connection, but may comprise an electrical connection which is direct or indirect.

Figure 1:
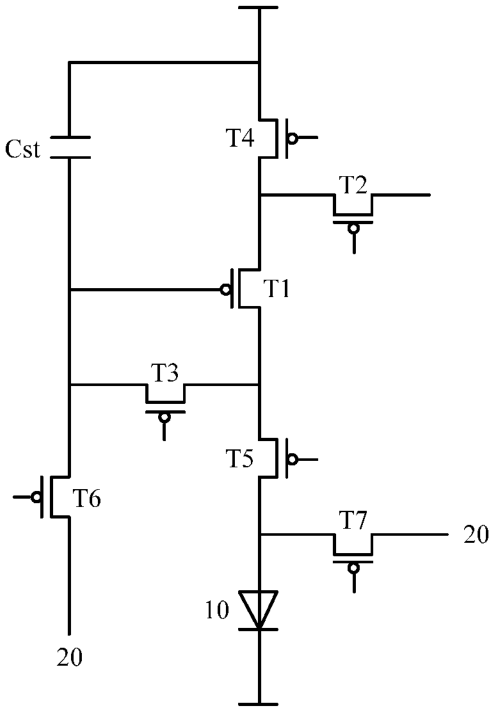
FIG. 1 is a schematic diagram of a pixel driving circuit.

FIG. 1 is a schematic diagram of a pixel driving circuit. As illustrated by FIG. 1, the pixel driving circuit includes a driving transistor T1, a compensation transistor T3, a data writing transistor T2, a first light emitting control transistor T4, a second light emitting control transistor T5, an initialization transistor T6, and an electrode reset transistor T7. A source electrode of the driving transistor T1, a drain electrode of the data writing transistor T2 and a drain electrode of the first light emitting control transistor T4 are electrically connected; a drain electrode of the driving transistor T1, a source electrode of the compensating transistor T3 and a source electrode of the second light emitting control transistor T5 are electrically connected; a gate electrode of the driving transistor T1, a drain electrode of the compensating transistor T3 and a drain electrode of the initialization transistor T6 are electrically connected; a drain electrode of the second light emitting control transistor T5 and a drain electrode of the electrode reset transistor T7 are electrically connected to an anode 11 of a light emitting element 10.

As illustrated by FIG. 1, the initialization transistor T6 and the electrode reset transistor T7 are connected to the same initialization signal line 20, and the initialization signal line 20 needs to drive two kinds of transistors, so that the voltage drop of the initialization signal line from one end to the other end is large, which leads to different potentials of initialization signals reset to the anodes of different light emitting elements upon the electrode reset transistor T7 being reset, thus causing problems such as poor brightness uniformity and abnormal brightness jump. On the other hand, because the above initialization signal is used to initialize the voltage of the gate electrode of the driving transistor T1 and the voltage of the anode of the light emitting element, the initialization signal needs to meet the initialization requirements of the gate electrode of the driving transistor T1, and the voltage of the initialization signal is usually larger than that of the driving signal on the cathode of the light emitting element. Therefore, in the case where the above initialization signal is used to initialize the voltage of the anode of the light emitting element, there is still a certain voltage difference (usually 1V or more) between the anode and the cathode of the light emitting element, which cannot ensure that the light emitting element is completely turned off.

In this regard, embodiments of the present disclosure provide an array substrate and a display device. The array substrate includes abase substrate and a plurality of pixel driving circuits arranged on the base substrate; each pixel driving circuit includes a driving transistor, a first light emitting control transistor, a compensation transistor, a first initialization transistor and a second initialization transistor; a first electrode of the first initialization transistor and a first electrode of the first light emitting control transistor are connected to a first node, the first initialization transistor is configured to provide a first initialization signal to an anode of a light emitting element through the first node, a first electrode of the second initialization transistor and a first electrode of the compensation transistor are connected to a second node, and the second initialization transistor is configured to provide a second initialization signal to a gate electrode of the driving transistor through the second node, a second electrode of the first initialization transistor is configured to receive a first initialization signal, and a cathode of the light emitting element is configured to receive the first driving signal, and a difference between a potential of the first initialization signal and a potential of the first driving signal is less than 1.5V. Therefore, by setting the difference between the potential of the first initialization signal and the potential of the first driving signal to be less than 1.5V, the array substrate can reduce the voltage difference between the anode and cathode of the light emitting element when initializing the anode of the light emitting element, so that the charge on the anode of the light emitting element can be quickly discharged, and the light emitting element can be turned off completely, so that the problems of stroboscopic and uneven brightness in low gray scale can be alleviated, and the contrast can be improved. In addition, the first initialization signal and the second initialization signal of the array substrate can be transmitted by different initialization signal lines, thereby reducing the load on a single initialization signal line, reducing the voltage drop on a single initialization signal line, and further improving the brightness uniformity.

Hereinafter, the array substrate and the display device provided by the embodiments of the present disclosure will be described below with reference to the accompanying drawings.

Figure 2:
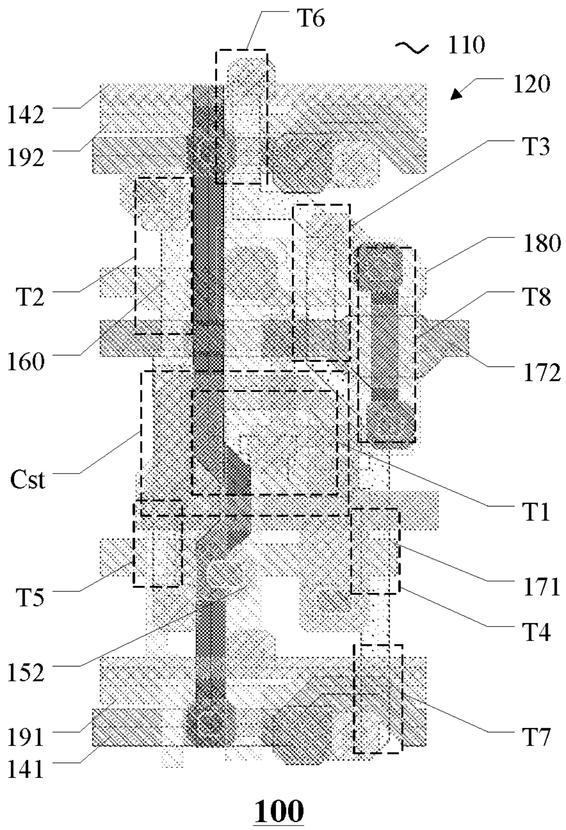
FIG. 2 is a schematic plan view of an array substrate according to an embodiment of the present disclosure.
Figure 3:
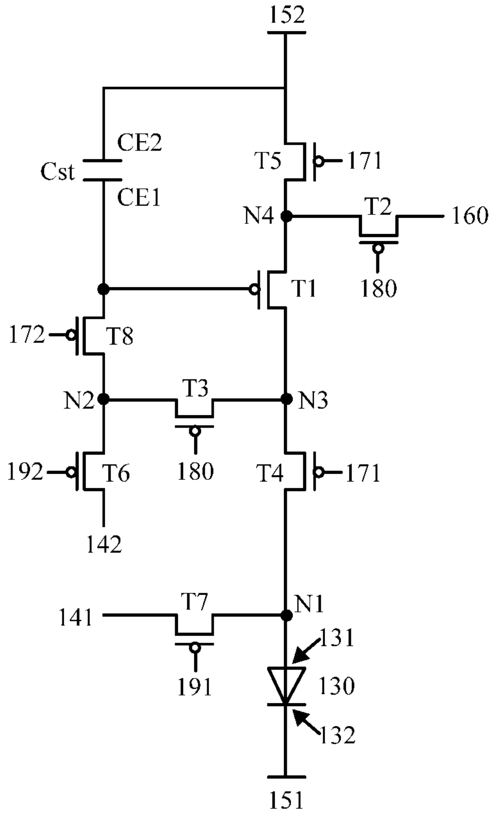
FIG. 3 is an equivalent schematic diagram of a pixel driving circuit in an array substrate according to an embodiment of the present disclosure.

An embodiment of the present disclosure provides an array substrate. FIG. 2 is a schematic plan view of an array substrate according to an embodiment of the present disclosure; FIG. 3 is an equivalent schematic diagram of a pixel driving circuit in an array substrate according to an embodiment of the present disclosure.

As illustrated by FIG. 2 and FIG. 3, the array substrate 100 includes a base substrate 110 and a plurality of pixel driving circuits 120 disposed on the base substrate 110. Each pixel driving circuit 120 includes a driving transistor T1, a first light emitting control transistor T4, a compensation transistor T3, a first initialization transistor T7 and a second initialization transistor T6; a first electrode of the first initialization transistor T7 and a first electrode of the first light emitting control transistor T4 are connected to the first node N1, and the first initialization transistor T7 is configured to provide a first initialization signal Vinit1 to an anode 131 of a light emitting element 130 through the first node N1, thereby initializing the anode 131 of the light emitting element 130. A first electrode of the second initialization transistor T6 and a first electrode of the compensation transistor T3 are connected to the second node N2, and the second initialization transistor T6 is configured to provide a second initialization signal Vinit2 to a gate electrode of the driving transistor T1 through the second node N2, so that the gate electrode of the driving transistor T1 can be initialized.

As illustrated by FIG. 2 and FIG. 3, a second electrode of the first initialization transistor T7 is configured to receive the first initialization signal Vinit1, and a cathode 132 of the light emitting element 130 is configured to receive a first driving signal Vss. A difference between a potential of the first initialization signal Vinit1 and a potential of the first driving signal Vss is less than 1.5V.

In the array substrate provided by the embodiment of the present disclosure, by setting the difference between the potential of the first initialization signal Vinit1 and the potential of the first driving signal Vss to be less than 1.5V, the voltage difference between the anode and the cathode of the light emitting element can be reduced upon the anode of the light emitting element being initialized, so that the charge on the anode of the light emitting element can be quickly released, and the light emitting element can be turned off completely. Therefore, the array substrate can alleviate the problem of stroboscopic and uneven brightness in low gray scale; and because the array substrate can realize the complete turning off of the light emitting elements, the array substrate can also improve the contrast. On the other hand, the first initialization signal and the second initialization signal of the array substrate can be transmitted by different initialization signal lines, thereby reducing the load on a single initialization signal line and reducing the voltage drop on the single initialization signal line. Thus, the array substrate can improve the uniformity of initialization signals reset to the anodes of different light emitting elements when initializing the anodes of light emitting elements, thereby alleviating the problems of poor brightness uniformity, abnormal brightness jump, Flicker and the like.

It should be noted that the transistors used in the embodiments of the present disclosure can be triodes, thin film transistors, field effect transistors or other similar transistors. In the present disclosure, in order to distinguish the two electrodes of a transistor except the control electrode, one of these two electrodes is called the first electrode and the other is called the second electrode. For example, in the case where the transistor is a triode, the first electrode can be the collector and the second electrode can be the emitter; in the case where the transistor is a thin film transistor or a field effect transistor, the first electrode can be a drain electrode and the second electrode can be a source electrode. Of course, the embodiments of the present disclosure include but are not limited thereto, and the types of electrodes referred to by the above-mentioned first electrode and second electrode can be interchanged.

In some examples, further, the difference between the potential of the first initialization signal Vinit1 and the potential of the first driving signal Vss is less than 0.5V.

In some examples, as illustrated by FIG. 2 and FIG. 3, each pixel driving circuit 120 further includes a storage capacitor Cst, and the gate electrode of the driving transistor T1 is electrically connected with a first electrode plate CE1 of the storage capacitor Cst. The second initialization transistor T6 can simultaneously provide a second initialization signal to the gate electrode of the driving transistor T1 and the first electrode plate CE1 of the storage capacitor Cst through the second node N2, so that the gate electrode of the driving transistor T1 and the first electrode plate CE1 of the storage capacitor Cst can be initialized.

In some examples, as illustrated by FIG. 2 and FIG. 3, the potential of the first initialization signal Vinit1 and the potential of the second initialization signal Vinit2 are different. Therefore, the first initialization signal and the second initialization signal of the array substrate are transmitted by different initialization signal lines, thereby reducing the load on a single initialization signal line and reducing the voltage drop on the single initialization signal line. Therefore, the array substrate can improve the uniformity of initialization signals reset to the anodes of different light emitting elements when initializing the anodes of light emitting elements, thereby alleviating the problems of poor brightness uniformity, abnormal brightness jump, Flicker and the like.

In some examples, as illustrated by FIG. 2 and FIG. 3, the potential of the first initialization signal Vinit1 is the same as that of the first driving signal Vss. Therefore, by setting the potential of the first initialization signal and the potential of the first driving signal to be the same, the array substrate provided by the embodiment of the present disclosure can eliminate the voltage difference between the anode and cathode of the light emitting element when initializing the anode of the light emitting element, so that the light emitting element can be completely turned off, and the display quality can be improved. In addition, because the cathodes of light emitting elements and Vss signal lines are distributed throughout the array substrate, the voltage drop of the initialization signal line used to transmit the first initialization signal Vinit1 can be further reduced, so that the uniformity of initialization signals reset to the anodes of different light emitting elements can be further improved, and the problems of poor brightness uniformity, abnormal brightness jump, Flicker and the like can be alleviated.

In some examples, as illustrated by FIG. 2 and FIG. 3, the array substrate 100 further includes a first initialization signal line 141, a second initialization signal line 142, a light emitting element 130, and a first power line 151; the first initialization signal line 141 extends in the first direction and applies the first initialization signal Vinit1 to the second electrode of the first initialization transistor T7. The second initialization signal line 142 extends in the first direction and is connected with the second electrode of the second initialization transistor T6 to apply the second initialization signal Vinit2 to the second electrode of the second initialization transistor T6. The light emitting element 130 includes an anode 131 and a cathode 132; the first power line 151 is used to provide a cathode signal to the cathode 132 of the light emitting element 130. The anode 131 of the light emitting element 130 is electrically connected with the first node N1, and the first initialization signal line 141 is connected with the first power line 151 or the cathode 132 of the light emitting element 130.

In the array substrate provided in this example, because the first initialization signal Vinit1 of the first initialization signal line 141 is the same as the first driving signal Vss of the first power line 151, the voltage difference between the anode and the cathode of the light emitting element can be zero when initializing the anode of the light emitting element, so that the charge in the anode of the light emitting element can be quickly released and the light emitting element can be turned off completely. The array substrate can further alleviate the problem of stroboscopic and uneven brightness in low gray scale; and because the array substrate can realize the complete turning off of the light emitting elements, the array substrate can further improve the contrast. In addition, because the first initialization signal line is electrically connected with the first power line or the cathode of the light emitting element, the first initialization signal line does not need to be routed separately, so that the resistance and voltage drop of the first initialization signal line are small, and the uniformity of initialization signals reset to the anodes of different light emitting elements can be further improved, so that the problems of poor brightness uniformity, abnormal brightness jump, Flicker and the like can be alleviated, and the display quality of the display device adopting the array substrate can be significantly improved.

For example, the light emitting element 130 may further include a light emitting layer (not shown) between the anode 131 and the cathode 132, the specific structure of the light emitting element 130 can be found in the general design. For example, the light emitting element may be an organic light emitting diode, and the light emitting layer may be an organic light emitting layer. In addition, the light emitting element may also include auxiliary functional film layers such as an electron transport layer, an electron injection layer, a hole transport layer and a hole injection layer.

In some examples, as illustrated by FIG. 2 and FIG. 3, the pixel driving circuit 120 further includes a second light emitting control transistor T5 and a data writing transistor T2. The array substrate 100 further includes a second power line 152, a data line 160, a first light emitting control line 171, a gate line 180, a first reset signal line 191 and a second reset signal line 192; the first electrode of the driving transistor T1, the second electrode of the first light emitting control transistor T4 and the second electrode of the compensation transistor T3 are connected to the third node N3, the gate electrode of the driving transistor T1 is connected with the first electrode plate CE1 of the storage capacitor Cst, and the second electrode of the driving transistor T1, the first electrode of the data writing transistor T2 and the first electrode of the second light emitting control transistor T5 are connected to the fourth node N4.

In some examples, as illustrated by FIG. 2 and FIG. 3, the gate electrode of the first initialization transistor T7 is connected with the first reset signal line 191, and the first reset signal line 191 can provide a reset signal to the gate electrode of the first initialization transistor T7; the gate electrode of the second initialization transistor T6 is connected to a second reset signal line 192, which can provide a reset signal to the gate electrode of the second initialization transistor T6. The second electrode of the data writing transistor T2 is connected with the data line 160, the gate electrode of the data writing transistor T2 and the gate electrode of the compensation transistor T3 are respectively connected with the gate line 180, the second electrode of the second light emitting control transistor T5 and the second electrode plate CE2 of the storage capacitor Cst are respectively connected with the second power line 152, and a gate electrode of the first light emitting control transistor T4 and a gate electrode of the second light emitting control transistor T5 are respectively connected with the first light emitting control line 171. The first light emitting control line 171 may provide light emitting control signals to the gate electrode of the first light emitting control transistor T4 and the gate electrode of the second light emitting control transistor T5, respectively.

An operation mode of the above pixel driving circuit will be schematically described below. At first, a reset signal is transmitted to the gate electrode of the first initialization transistor T7 through the first reset signal line 191 and the first initialization transistor T7 is turned on, and the first initialization signal Vinit1 is provided to the second electrode of the first initialization transistor T7 through the first initialization signal line 141. At this time, the residual current of the anode 131 of the light emitting element 130 is discharged through the first initialization transistor T7, so that light emission because of the residual current on the anode of the light emitting element can be suppressed.

The reset signal is transmitted to the gate electrode of the second initialization transistor T6 through the second reset signal line 192 and the second initialization transistor T6 is turned on; at this time, the second initialization signal Vinit2 is transmitted to the second electrode of the second initialization transistor T6 through the second initialization signal line 142. At this time, the second initialization signal Vinit2 can be applied to the gate electrode of the driving transistor T1 and the first electrode plate CE1 of the storage capacitor Cst through the second initialization transistor T6, so that the gate electrode of the driving transistor T1 and the storage capacitor Cst are initialized.

Then, a gate signal is transmitted to the gate electrode of the data writing transistor T2 and the gate electrode of the compensation transistor T3 through the gate line 180, and the data writing transistor T2 and the compensation transistor T3 are turned on; the data signal Vd is transmitted to the second electrode of the data writing transistor T2 through the data line 160; at this time, the driving transistor T1 is turned on, and the data signal Vd is applied to the gate electrode of the driving transistor T1 through the data writing transistor T2 and the compensation thin film transistor T3. At this time, the voltage applied to the gate electrode of the driving transistor T1 is the compensation voltage Vd+Vth, and the compensation voltage applied to the gate electrode of the driving transistor T1 is also applied to the first electrode plate CE1 of the storage capacitor Cst.

Then, the driving voltage Vel is applied to the second electrode plate CE2 of the storage capacitor Cst through the second power line 152, and the compensation voltage Vd+Vth is applied to the first electrode plate CE1, so that the charges corresponding to the difference between the voltages applied to the two electrode plates of the storage capacitor Cst are stored in the storage capacitor Cst, and the driving transistor T1 is turned on for a predetermined time.

Subsequently, emitting control signals are applied to the gate electrode of the first emitting control transistor T4 and the gate electrode of the second emitting control transistor T5 through the first emitting control line 171, and both the first emitting control transistor T4 and second emitting control transistor T5 are turned on, and the second driving signal Vel is applied to the second electrode of the second emitting control transistor T5 through the second power line 152. At this time, when the second driving signal Vel passes through the driving transistor T1 turned on by the storage capacitor Cst, the voltage of the second electrode of the driving transistor T1 is Vel, and the voltage of the gate electrode of the driving transistor T1 is Vd+Vth, so that the driving transistor T1 can be in a saturated state, and the driving current Ids: Id=K*((Vd+Vth−Vel)−Vth) 2=K*(Vd−Vel)2, K is a structural constant related to the process and the design. Then, the driving current Id is applied to the anode of the light emitting element through the first light emitting control transistor T4, so that the light emitting element emits light.

It should be noted that the above operation mode of the driving circuit is only one possible driving mode of the driving circuit, and the embodiments of the present disclosure include but are not limited thereto.

In some examples, as illustrated by FIG. 2, the orthographic projection of the first initialization signal line 141 on the base substrate 110 and the orthographic projection of the first reset signal line 191 on the base substrate 110 at least partially do not overlap, so that the load can be reduced; similarly, the orthographic projection of the second initialization signal line 142 on the base substrate 110 and the orthographic projection of the second reset signal line 192 on the base substrate 110 at least partially do not overlap, so that the load can be reduced.

In some examples, as illustrated by FIG. 2 and FIG. 3, the pixel driving circuit 120 further includes an anti-leakage transistor T8, the first electrode of the anti-leakage transistor T8 is electrically connected to the gate electrode of the driving transistor T1, the second electrode of the anti-leakage transistor T8 is connected to the second node N2, and the second initialization transistor T6 initializes the gate electrode of the driving transistor T1 through the second node N2 and the anti-leakage transistor T8.

During the operation of the pixel driving circuit, the stability of the voltage on the gate electrode of the driving transistor T1 is an important factor related to the display quality such as the uniformity of the display brightness and whether the Flicker phenomenon occurs. Because the first electrode of the second initialization transistor T6 and the first electrode of the compensation transistor T3 are connected to the second node N2, assuming that the second node N2 is directly connected to the gate electrode of the driving transistor T1, to ensure the stability of the voltage on the gate electrode of the driving transistor T1, it is necessary to reduce the leakage current of the second initialization transistor T6 and the compensation transistor T3. However, the array substrate provided in this example can improve the stability of the voltage on the gate electrode of the driving transistor T1 only by reducing the leakage current of the anti-leakage transistor T8 by arranging the anti-leakage transistor T8 between the second node N2 and the gate electrode of the driving transistor T1, thus improving the display quality.

In some examples, the material of the active layer of the anti-leakage transistor T8 includes an oxide semiconductor material. It should be noted that the transistor whose active layer is made of oxide semiconductor material has the characteristics of good hysteresis characteristics and low leakage current (below 1e-14A), and at the same time, its mobility is also low, which can realize low leakage current and ensure the voltage stability on the gate electrode of the driving transistor T1.

In some examples, the materials of the active layer of the first light emitting control transistor, the active layer of the second light emitting control transistor, the active layer of the compensation transistor, the active layer of the first initialization transistor, the active layer of the second initialization transistor, the active layer of the driving transistor, and the active layer of the data writing transistor include silicon-based semiconductor materials, such as low-temperature polysilicon (LTPS), which can have higher mobility and more stable source voltage. Therefore, the array substrate can make use of the characteristics of two transistors at the same time, thus achieving better display quality. In addition, because the array substrate provided in this example is provided with the anti-leakage transistor T8 between the second node N2 and the gate electrode of the driving transistor T1, only the anti-leakage transistor T8 can be provided as a transistor whose active layer is an oxide semiconductor, so that the layout difficulty and manufacturing cost of the array substrate can be reduced.

In some examples, as illustrated by FIG. 2 and FIG. 3, the array substrate 100 further includes a second gate line 172, and the gate electrode of the anti-leakage transistor T8 is connected with the second gate line 172; the active layer of the anti-leakage transistor T8 is located on a side of the second electrode plate CE2 away from the base substrate 110, and the first initialization line 141 and the second gate line 142 are arranged on the same layer, and are located on a side of the active layer of the anti-leakage transistor T8 away from the base substrate 110. Therefore, the second gate line 172 can be used to control the turn-on and turn-off of the anti-leakage transistor T8; and the first initialization line 141 is located on a side of the active layer of the anti-leakage transistor T8 away from the base substrate 110, so as to facilitate connection with the first power line 151.

FIGS. 4A-4G are schematic diagrams of film layers of pixel driving circuits in an array substrate according to an embodiment of the present disclosure.

Figure 4A:
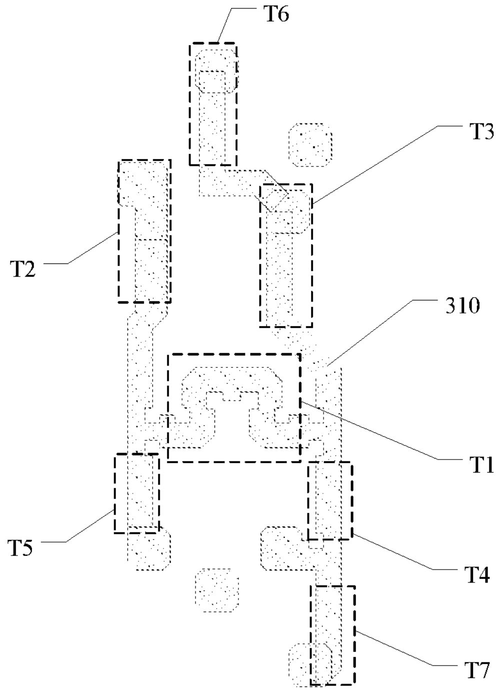
FIG. 4A-FIG. 4G are schematic diagrams of film layers of a pixel driving circuit in an array substrate provided by an embodiment of the present disclosure.

In some examples, as illustrated by FIG. 4A, the array substrate 100 includes a base substrate 110 and a first semiconductor layer 310 on the base substrate 110. The first semiconductor layer 310 includes an active layer of a driving transistor T1, an active layer of a data writing transistor T2, an active layer of a compensation transistor T3, an active layer of a first light emitting control transistor T4, an active layer of a second light emitting control transistor T5, an active layer of a first initialization transistor T7 and an active layer of a second initialization transistor T6.

For example, the first semiconductor layer 310 can be made of low-temperature polycrystalline silicon (LTPS) material, so that the driving transistor T1, the data writing transistor T2, the compensation transistor T3, the first light emitting control transistor T4, the second light emitting control transistor T5, the first initialization transistor T7 and the second initialization transistor T6 have higher mobility and more stable source voltages.

Figure 4B:
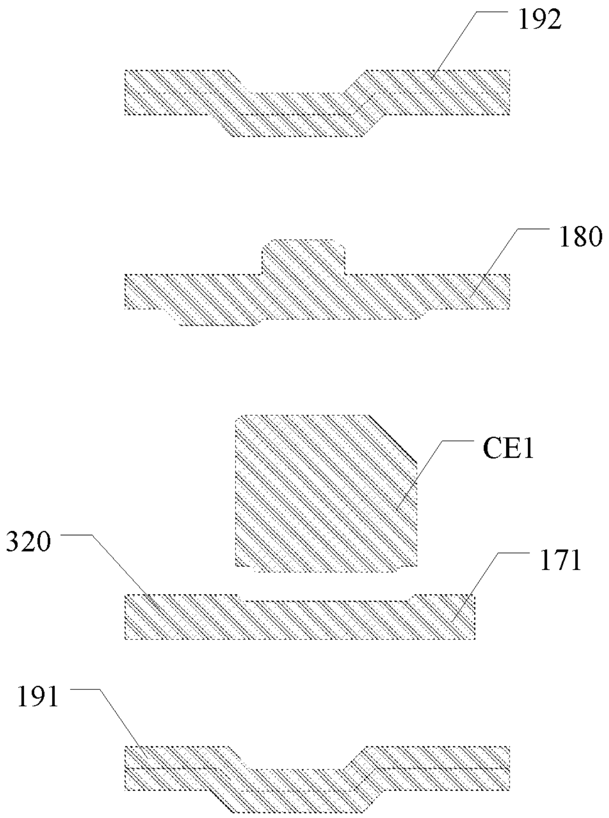

For example, as illustrated by FIG. 4B, the array substrate 100 includes a first gate layer 320 located on the side of the first semiconductor layer 310 away from the base substrate 110; the first gate layer 320 includes a first reset signal line 191, a second reset signal line 192, a first electrode plate CE1, a gate line 180 and a first light emitting control line 171. The first reset signal line 191 overlaps with the active layer of the first initialization transistor T7, and the part where the first reset signal line 191 overlaps with the first initialization transistor T7 can be used as the gate electrode of the first initialization transistor T7; the second reset signal line 192 overlaps with the active layer of the second initialization transistor T6, and the part where the second reset signal line 192 overlaps with the second initialization transistor T6 can be used as the gate electrode of the second initialization transistor T6; the gate line 180 overlaps with the active layer of the data writing transistor T2 and the active layer of the compensation transistor T3, respectively, and the part of the gate line 180 overlapping with the active layer of the data writing transistor T2 can be used as the gate electrode of the data writing transistor T2, and the part of the gate line 180 overlapping with the active layer of the compensation transistor T3 can be used as the gate electrode of the compensation transistor T3. The first light emitting control line 171 overlaps with the active layer of the first light emitting control transistor T4 and the active layer of the second light emitting control transistor T5, respectively, and the part where the first light emitting control line 171 overlaps with the active layer of the first light emitting control transistor T4 can be used as the gate electrode of the first light emitting control transistor T4, the part where the first light emitting control line 171 overlaps with the active layer of the second light emitting control transistor T5 can be used as the gate electrode of the second light emitting control transistor T5.

Figure 4C:
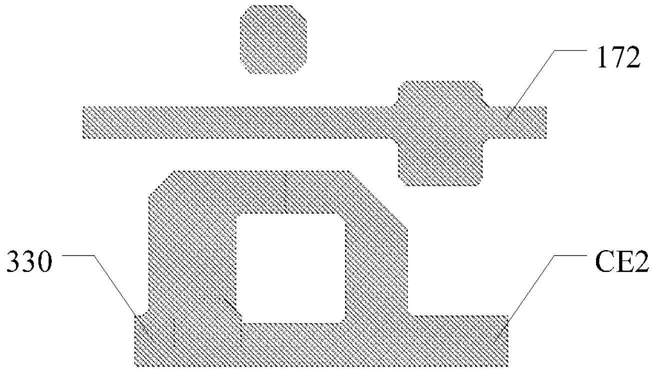

For example, as illustrated by FIG. 4C, the array substrate 100 further includes a second gate layer 330 located on a side of the first gate layer 320 away from the base substrate 110, and the second gate layer 330 includes a second gate line 172 and a second electrode plate CE2. An orthographic projection of the second electrode plate CE2 on the base substrate 110 overlaps an orthographic projection of the first electrode plate CE1 on the base substrate 110 to form the storage capacitor Cst.

Figure 4D:
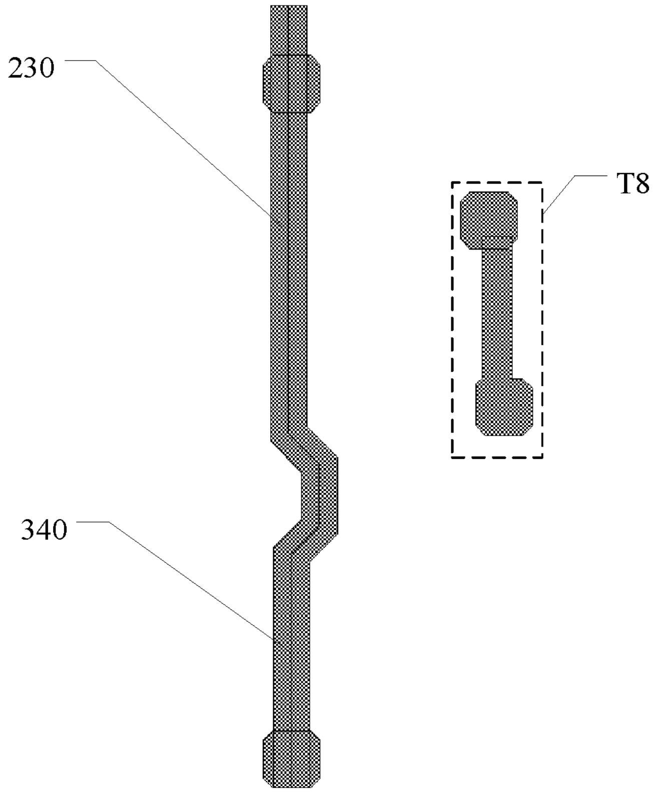

For example, as illustrated by FIG. 4D, the array substrate 100 further includes a second semiconductor layer 340 located on a side of the second gate layer 330 away from the base substrate 110, and the second semiconductor layer 340 includes the active layer of the anti-leakage transistor T8. The second semiconductor layer 340 may be made of an oxide semiconductor material (for example, indium gallium zinc oxide (IGZO)), so that the anti-leakage transistor T8 has a lower leakage current.

Figure 4E:
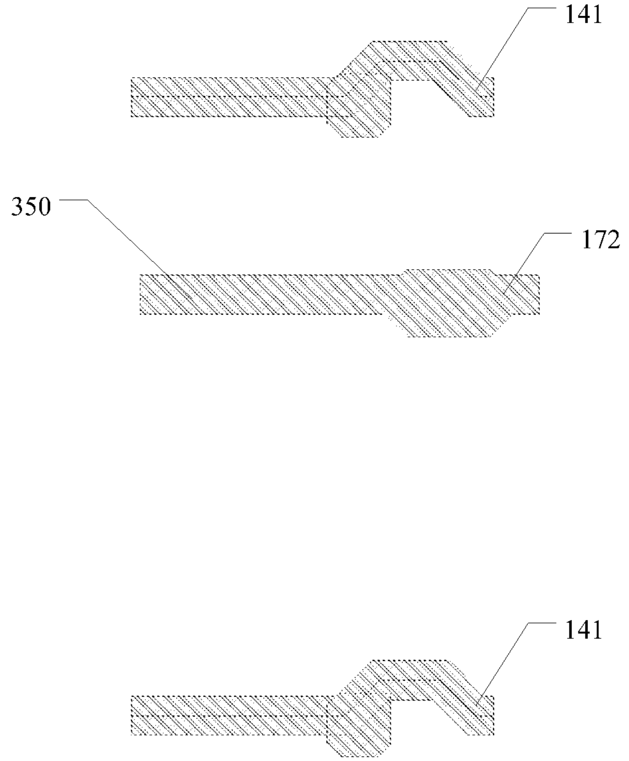

For example, as illustrated by FIG. 4E, the array substrate 100 further includes a third gate layer 350 located on a side of the second semiconductor layer 340 away from the base substrate 110; the third gate layer 350 includes a second gate line 172 and a first initialization signal line 141. The second gate line 172 overlaps with the active layer of the anti-leakage transistor T8, and the overlapping part of the active layer of the anti-leakage transistor T8 and the second gate line 172 can be used as the gate electrode of the anti-leakage transistor T8. Therefore, the anti-leakage transistor T8 has a double-gate structure, which can further reduce the leakage current.

Figure 4F:
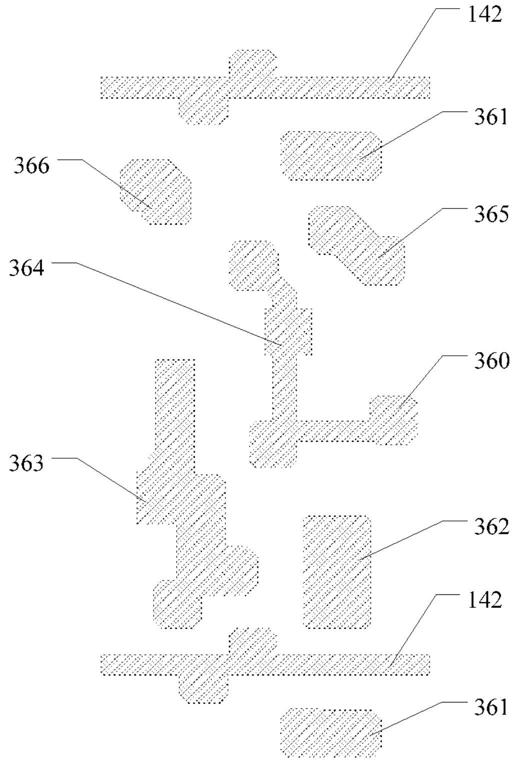

For example, as illustrated by FIG. 4F, the array substrate 100 further includes a first conductive layer 360 located on a side of the third gate layer 350 away from the base substrate 110; the first conductive layer 360 includes the second initialization signal line 142, a first connection block 361, a second connection block 362, a third connection block 363, a fourth connection block 364, a fifth connection block 365 and a sixth connection block 366.

As illustrated by FIGS. 4E and 4F, because the film layer where the first initialization signal line 141 is located is far away from the film layer where the active layer of the first initialization transistor T7 is located, it is difficult to directly connect them through a via hole connection structure. In the array substrate provided in this example, the first initialization signal line 141 includes a first bent portion 141A, and the first bent portion 141A avoids the second electrode of the first initialization transistor T7, so that an orthographic projection of the first initialization signal line 141 on the base substrate 110 does not overlap with an orthographic projection of the second electrode of the first initialization transistor T7 on the base substrate 110. An orthographic projection of the first connection block 361 on the base substrate 110 overlaps with the orthographic projection of the first initialization signal line 141 and the orthographic projection of the second electrode of the first initialization transistor T7 on the base substrate 110, respectively, and the first connection block 361 electrically connects the first initialization signal line 141 with the second electrode of the first initialization transistor T7. Therefore, the via hole connection structure between the first connection block 361 and the first initialization signal line 141 only needs to be punched in one insulating layer, so the manufacturing difficulty is low and the process is easier to control. On the other hand, because of the avoidance of the first bent portion 141A, the via hole connection structure between the first connection block 361 and the second electrode of the first initialization transistor T7 has a large space, which can reduce the manufacturing difficulty and improve the yield. At this time, the first connection block 361 is located on a side of the first initialization signal line 141 away from the base substrate 110.

As illustrated by FIG. 4F, the second connection block 362 is configured connect with the first electrode of the first light emitting control transistor T4 to serve as a relay connection electrode. Therefore, the anode 131 of the light emitting element 130 can be electrically connected to the first electrode of the first light emitting control transistor T4 by being connected to the second connection block 362, thus reducing the difficulty of directly connecting the anode 131 of the light emitting element 130 to the first electrode of the first light emitting control transistor T4.

As illustrated by FIG. 4F, the third connection block 363 is configured to be connected with the second power line 152, the second electrode plate CE2 and the second electrode of the second light emitting control transistor T5, which are formed later, so that the second power line 152 can be electrically connected with the second electrode plate CE2 and the second light emitting control transistor T5, respectively.

As illustrated by FIG. 4F, the fourth connection block 364 is configured to be connected with the first electrode plate CE1 and the first electrode of the anti-leakage transistor T8, respectively, so that the first electrode plate CE1 and the first electrode of the anti-leakage transistor T8 can be electrically connected.

As illustrated by FIG. 4F, the fifth connection block 365 is configured to be connected with the second electrode of the anti-leakage transistor T8 and the first electrode of the compensation transistor T3, respectively. The sixth connection block 366 is configured to be connected with the data line 160 and the second electrode of the data writing transistor T2, respectively.

Figure 4G:
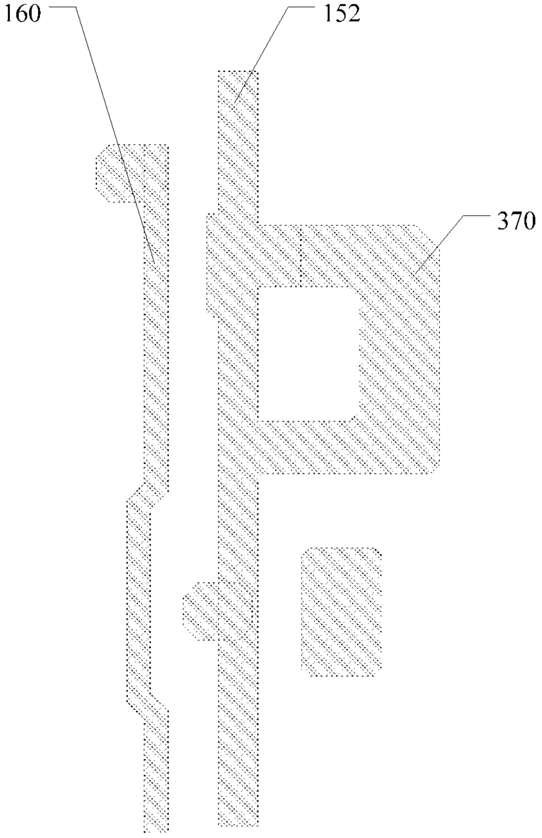

For example, as illustrated by FIG. 4G, the array substrate 100 further includes a second conductive layer 370, which is located on a side of the first conductive layer 360 away from the base substrate 110; the second conductive layer 370 includes the data line 160 and the second power line 152.

In some examples, as illustrated by FIG. 4A-FIG. 4F, the first initialization signal line 141 is located between the first reset signal line 191 or the second reset signal line 192 and the second initialization signal line 142 in the direction perpendicular to the base substrate 110.

Figure 5:
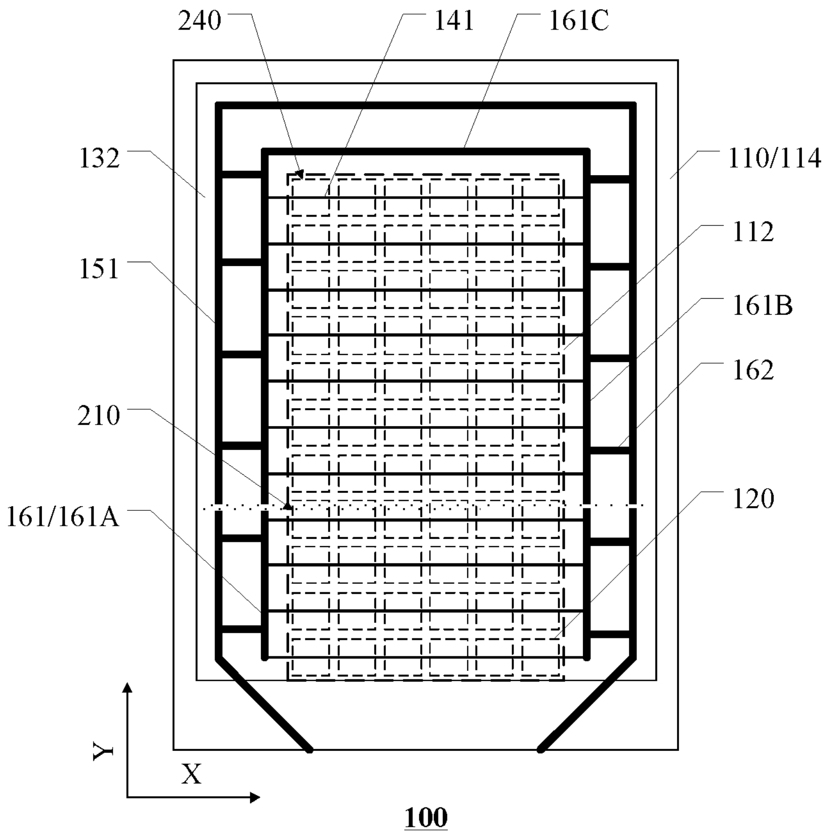
FIG. 5 is a schematic plan view of an array substrate according to an embodiment of the present disclosure.
Figure 6:
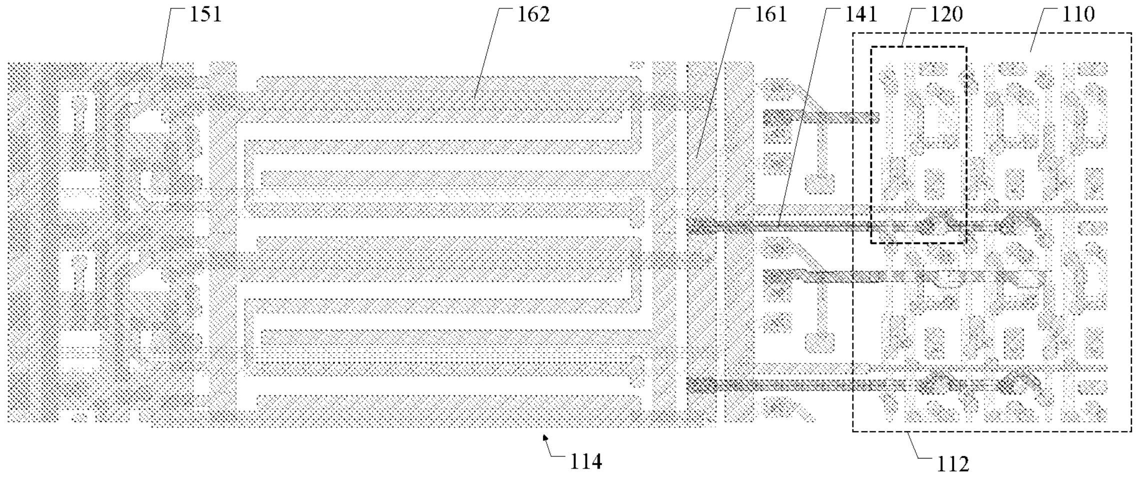
FIG. 6 is a partial schematic diagram of an array substrate provided by an embodiment of the present disclosure.

FIG. 5 is a schematic plan view of an array substrate according to an embodiment of the present disclosure; FIG. 6 is a partial schematic diagram of an array substrate according to an embodiment of the present disclosure. As illustrated by FIG. 5 and FIG. 6, the base substrate 110 includes a display region 112 and a peripheral region 114 around the display region 112. The pixel driving circuit 120 and the light emitting element 130 are located in the display region 112; a first power line 151 is located in the peripheral region 114. The array substrate 100 further includes a first connection line 161 and a second connection line 162 located in the peripheral region. The first initialization line 141 extends from the display region 112 to the peripheral region 114 and is connected with the first connection line 161. One end of the second connection line 162 is connected with the first power line 151, and the other end of the second connection line 162 is connected with the first connection line 161. Therefore, the array substrate can connect the first initialization line 141 with the first power line 151 through the first connection line 161 and the second connection line 162. In addition, compared with directly connecting respectively first initialization lines 141 to the first power line 151, the array substrate provided by this example can make the number of the second connection lines 162 between the first power line 151 and the first connection lines 161 less than the number of the first initialization signal lines 141, thus reducing the number of wirings in the peripheral region.

For example, the first power line 151 is arranged around the display region 112, so both ends of each first initialization line 141 can be electrically connected with the first power line 151, so that the voltage drop of the first initialization line 141 can be further reduced, and the potentials of initialization signals reset to the anodes of different light emitting elements are the same, so that problems such as poor brightness uniformity and abnormal brightness jump can be avoided, and the display quality of the display device using the array substrate can be significantly alleviated.

In some examples, as illustrated by FIG. 5 and FIG. 6, the first connection line 161 includes a first sub-connection portion 161A extending along a second direction Y intersecting the first direction X; a second sub-connection portion 161B extending in the second direction; and a third sub-connection portion 161C extending along the first direction, one end of the third sub-connection portion 161C being electrically connected with the first sub-connection portion 161A, and the other end of the third sub-connection portion 161C being electrically connected to the second sub-connection portion 161B. The first sub-connection portion 161A is located at a first side of the display region 112 in the first direction, the second sub-connection portion 161B is located at a second side opposite to the first side of the display region 112 in the first direction, and the third sub-connection portion 161C is located at a side of the display region 112 in the second direction, one end of the first initialization line 141 is electrically connected with the first sub-connection portion 161A, and the other end of the first initialization line 141 is electrically connected with the second sub-connection portion 161B. Therefore, the array substrate can reduce the voltage drop of the first initialization line 141, so that the potentials of initialization signals reset to the anodes of different light emitting elements are the same, thus avoiding the problems of poor brightness uniformity, abnormal brightness jump and the like, and thus significantly improving the display quality of the display device using the array substrate.

Figure 7:
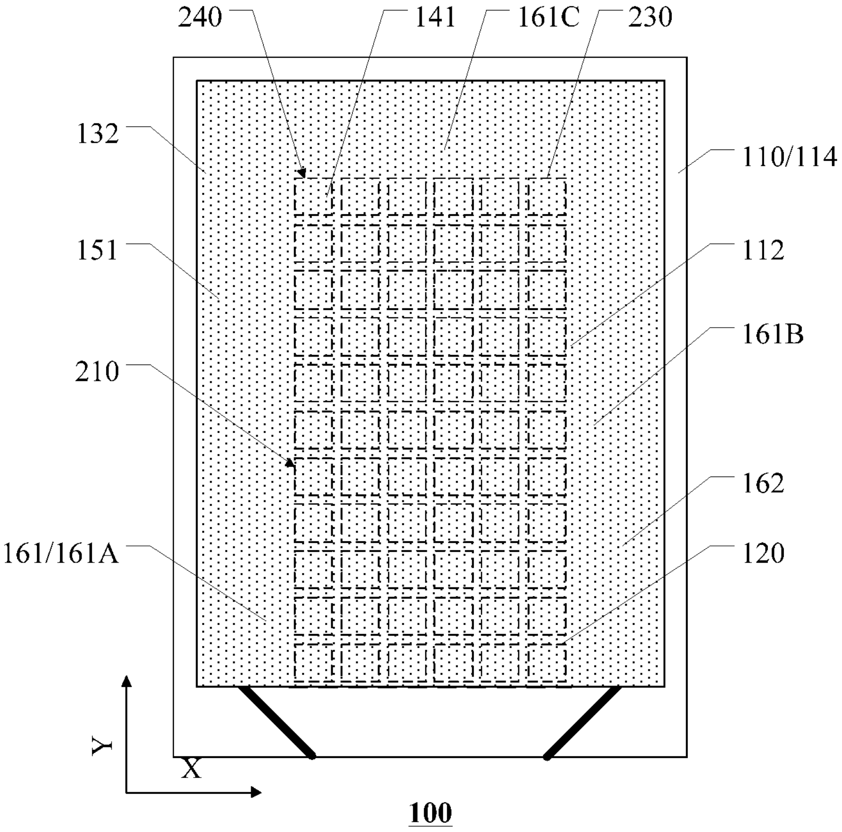
FIG. 7 is a schematic plan view of another array substrate provided by an embodiment of the present disclosure.

FIG. 7 is a schematic plan view of another array substrate according to an embodiment of the present disclosure. As illustrated by FIG. 7, a plurality of pixel driving circuits 120 may form a plurality of pixel driving rows 210, each pixel driving row 210 includes multiple pixel driving circuits 120 arranged in a first direction X, the plurality of pixel driving rows 210 arranged in the second direction Y intersecting the first direction X, and a plurality of first initialization signal lines 141 are provided, the plurality of first initialization signal lines 141 are configured to apply first initialization signals to the plurality of pixel driving rows 210. At this time, the array substrate 100 further includes at least one interconnection line 230, which extends in the second direction and is connected to the plurality of first initialization signal lines 141, respectively. Therefore, the interconnection line 230 can further reduce the voltage drop of the first initialization signal line 141, and further make the potentials of initialization signals reset to the anodes of different light emitting elements the same, so that problems such as poor brightness uniformity and abnormal brightness jump can be avoided, and the display quality of the display device using the array substrate can be significantly improved.

For example, as illustrated by FIG. 4D, the interconnection line 230 may be located in the second semiconductor layer 340, that is, the interconnection line 230 may be arranged in the same layer as the active layer of the anti-leakage transistor T8.

In some examples, as illustrated by FIG. 7, a plurality of pixel driving circuits 120 form a plurality of pixel driving columns 240, each pixel driving column 240 includes multiple pixel driving circuits 120 arranged in a second direction, and the plurality of pixel driving columns 240 are arranged in a first direction. The array substrate 100 includes a plurality of interconnection lines 230 as mentioned above, and the plurality of interconnection lines 230 are arranged corresponding to the plurality of pixel driving columns 240. Therefore, the array substrate can further reduce the voltage drop of the first initialization signal line 141 by correspondingly arranging one interconnection line 230 in each pixel driving column 240.

In some examples, as illustrated by FIG. 2, the array substrate 100 further includes a plurality of second power lines 152, which are arranged corresponding to the plurality of pixel driving columns 240; in an area corresponding to one pixel driving circuit 120, an overlapping area of the orthographic projection of the second power line 152 on the base substrate 110 and the orthographic projection of the interconnection line 230 on the base substrate 110 is less than 50% of the area of the orthographic projection of the interconnection line 230 on the base substrate 110, so that the capacitance between the interconnection line 230 and the power line 152 can be reduced and the load of the power line 152 can be reduced.

In some examples, as illustrated by FIG. 2, the overlapping area of the orthographic projections of the second power line 152 and the interconnection line 230 on the base substrate 110 is less than 20% of the orthographic projection area of the interconnection line 230 on the base substrate 110, so that the capacitance between the interconnection line 230 and the power line 152 can be further reduced and the load of the power line 152 can be reduced.

Figure 8:
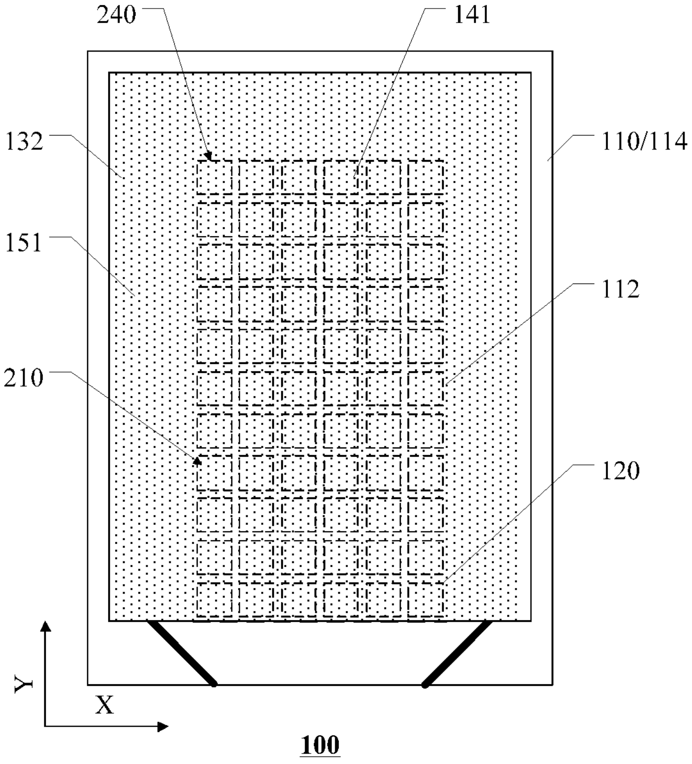
FIG. 8 is a schematic plan view of another array substrate provided by an embodiment of the present disclosure.

FIG. 8 is a schematic plan view of another array substrate according to an embodiment of the present disclosure. As illustrated by FIG. 8, the base substrate 110 includes a display region 112 and a peripheral region 114 around the display region 112. The pixel driving circuit 120 and the light emitting element 130 are located in the display region 112, the first power line 151 is located in the peripheral region 114, and the first initialization line 141 extends from the display region 112 to the peripheral region 114 and is directly connected to the first power line 151.

Figure 9:
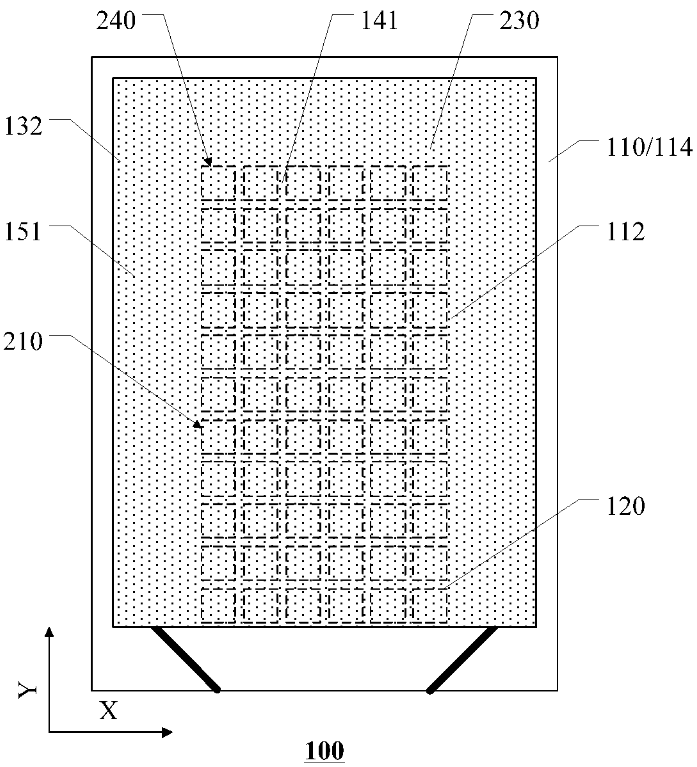
FIG. 9 is a schematic plan view of another array substrate provided by an embodiment of the present disclosure.

FIG. 9 is a schematic plan view of another array substrate according to an embodiment of the present disclosure. As illustrated by FIG. 9, a plurality of pixel driving circuits 120 may form a plurality of pixel driving rows 210, each pixel driving row 210 includes multiple pixel driving circuits 120 arranged in a first direction X, the plurality of pixel driving rows 210 arranged in a second direction Y intersecting the first direction X, and a plurality of first initialization signal lines 141 are provided, the plurality of first initialization signal lines 141 configured to apply first initialization signals to the plurality of pixel driving rows 210. At this time, the array substrate 100 further includes at least one interconnection line 230, which extends in the second direction and is connected to the plurality of first initialization signal lines 141, respectively. Therefore, the interconnection line 230 can further reduce the voltage drop of the first initialization signal line 141, and further make the potentials of initialization signals reset to the anodes of different light emitting elements the same, so that problems such as poor brightness uniformity and abnormal brightness jump can be avoided, and the display quality of the display device using the array substrate can be significantly improved.

In some examples, as illustrated by FIG. 9, a plurality of pixel driving circuits 120 form a plurality of pixel driving columns 240, each pixel driving column 240 includes multiple pixel driving circuits 120 arranged in a second direction, and a plurality of pixel driving columns 240 are arranged in a first direction. The array substrate 100 includes a plurality of interconnection lines 230 described above, and the plurality of interconnection lines 230 are arranged corresponding to the plurality of pixel driving columns 240. Therefore, the array substrate can further reduce the voltage drop of the first initialization signal line 141 by correspondingly arranging one interconnection line 230 in each pixel driving column 240.

Figure 10:
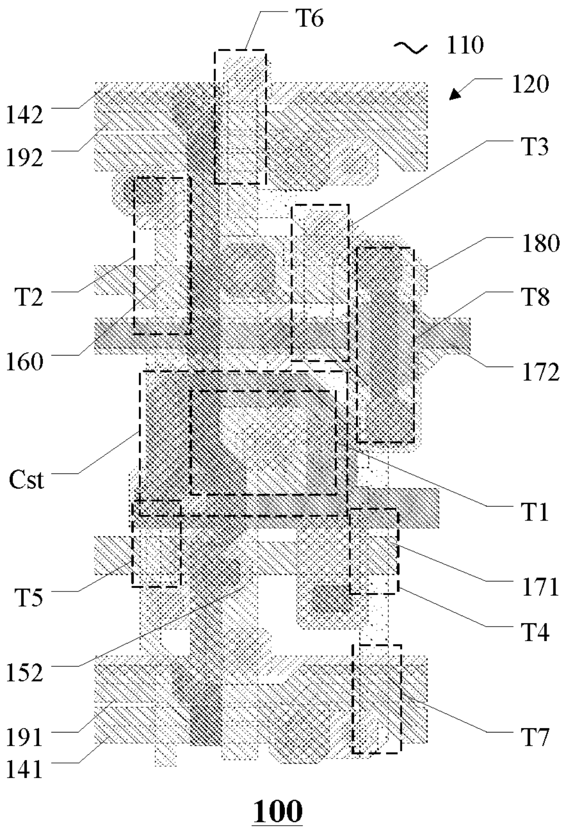
FIG. 10 is a schematic plan view of another array substrate provided by an embodiment of the present disclosure.

FIG. 10 is a schematic plan view of another array substrate provided by an embodiment of the present disclosure. As illustrated by FIG. 10, the array substrate 100 includes an interconnection line 230 extending in a second direction; unlike the array substrate shown in FIG. 2, the interconnection lines 230 are connected with a plurality of second initialization signal lines 142, respectively. Therefore, the interconnection line 230 can further reduce the voltage drop of the second initialization signal line 142, thereby significantly improving the display quality of the display device using the array substrate.

Figure 11:
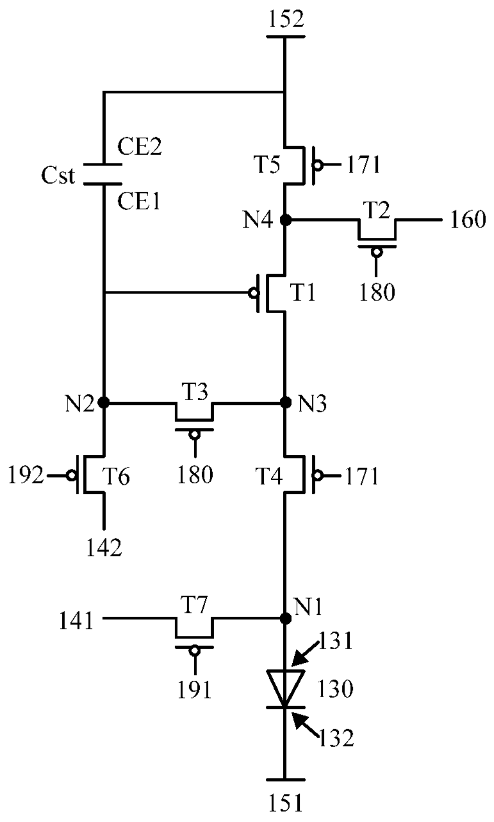
FIG. 11 is an equivalent schematic diagram of a pixel driving circuit in another array substrate provided by an embodiment of the present disclosure.

FIG. 11 is an equivalent schematic diagram of a pixel driving circuit in another array substrate according to an embodiment of the present disclosure. As illustrated by FIG. 11, the first electrode plate CE1 of the storage capacitor Cst and the gate electrode of the driving transistor T1 are directly connected to the second node N2. Therefore, the first initialization transistor T6 can directly initialize the gate electrode of the driving transistor T1 and the first electrode plate CE1 of the storage capacitor Cst through the second node N2.

Figure 12:
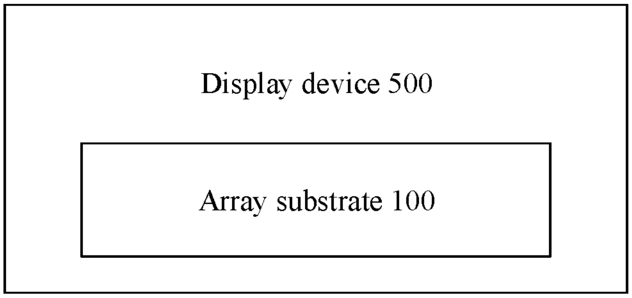
FIG. 12 is a schematic diagram of a display device provided by an embodiment of the present disclosure.

At least one embodiment of the present disclosure also provides a display device. FIG. 12 is a schematic diagram of a display device provided by an embodiment of the present disclosure. As illustrated by FIG. 12, the display device 500 includes the array substrate 100 as mentioned above. As the array substrate can reduce the voltage difference between the anode and cathode of the light emitting element when initializing the anode of the light emitting element, the charge on the anode of the light emitting element can be quickly released, and the light emitting element can be turned off completely, so that the problems of stroboscopic and uneven brightness in low gray scale can be alleviated, and the contrast can be improved. In addition, the first initialization signal and the second initialization signal of the array substrate can be transmitted by different initialization signal lines, thereby reducing the load on a single initialization signal line, reducing the voltage drop on a single initialization signal line, and further improving the brightness uniformity. Therefore, the display device can also improve the problem of stroboscopic and uneven brightness in low gray scale, and can improve the contrast and brightness uniformity.

For example, in some examples, the display device can be any product or component with display function, such as a smart phone, a tablet computer, a television, a monitor, a notebook computer, a digital photo frame, a navigator, etc.

The following points need to be explained:

(1) In the drawings of the embodiments of the present disclosure, only the structures related to the embodiments of the present disclosure are involved, and other structures can refer to the general design.

(2) The features of the same embodiment and different embodiments of the present disclosure can be combined with each other without conflict.

The above are only the specific embodiments of this disclosure, but the scope of protection of the present disclosure is not limited thereto. Any skilled in the art can easily think of changes or substitutions within the technical scope disclosed in the present disclosure, which should be covered by the scope of protection of this disclosure. Therefore, the scope of protection of the present disclosure should be based on the scope of protection of the claims.

What is claimed is:

1. An array substrate, comprising:

a base substrate; and a plurality of pixel driving circuits, arranged in an array on the base substrate, wherein each of the pixel driving circuits comprises a driving transistor, a first light emitting control transistor, a compensation transistor, a first initialization transistor and a second initialization transistor, a first electrode of the first initialization transistor and a first electrode of the first light emitting control transistor are connected to a first node, and the first initialization transistor is configured to provide a first initialization signal to an anode of a light emitting element through the first node, a first electrode of the second initialization transistor and a first electrode of the compensation transistor are connected to a second node, and the second initialization transistor is configured to provide a second initialization signal to a gate electrode of the driving transistor through the second node, a second electrode of the first initialization transistor is configured to receive the first initialization signal, and a cathode of the light emitting element is configured to receive a first driving signal, and a difference between a potential of the first initialization signal and a potential of the first driving signal is less than 1.5V, wherein the array substrate further comprises:

a first initialization signal line, extending in a first direction and connected to the second electrode of the first initialization transistor to apply the first initialization signal to the second electrode of the first initialization transistor;

a second initialization signal line, extending in the first direction and connected to the second electrode of the second initialization transistor to apply the second initialization signal to the second electrode of the second initialization transistor;

the light emitting element including the anode and the cathode; and a first power line, the anode of the light emitting element is electrically connected with the first node, and the first initialization signal line is electrically connected with the first power line or the cathode of the light emitting element, the base substrate comprises a display region and a peripheral region around the display region, the pixel driving circuit and the light emitting element are located in the display region, and the first power line is located in the peripheral region, the array substrate further comprises:

a first connection line, located in the peripheral region; and a second connection line, is located in the peripheral region, the first initialization line extends from the display region to the peripheral region and is connected with the first connection line, one end of the second connection line is connected with the first power line, and the other end of the second connection line is connected with the first connection line.

2. The array substrate according to claim 1, wherein the potential of the first initialization signal and a potential of the second initialization signal are different.

3. The array substrate according to claim 1, wherein the potential of the first initialization signal and the potential of the first driving signal are the same.

4. The array substrate according to claim 3, wherein each of the pixel driving circuits further comprises a second light emitting control transistor, a storage capacitor and a data writing transistor, the array substrate further comprises a second power line, a data line, a first light emitting control line, a gate line and a reset signal line, a first electrode of the driving transistor, a second electrode of the first light emitting control transistor and a second electrode of the compensation transistor are connected to a third node, the gate electrode of the driving transistor is connected to a first electrode plate of the storage capacitor, a second electrode of the driving transistor, a first electrode of the data writing transistor and a first electrode of the second light emitting control transistor are connected to a fourth node, a gate electrode of the first initialization transistor and a gate electrode of the second initialization transistor are respectively connected with reset signal lines of two adjacent rows, the second electrode of the data writing transistor is connected with the data line, the gate electrode of the data writing transistor and the gate electrode of the compensation transistor are respectively connected with the gate line, the second electrode of the second light emitting control transistor and a second electrode plate of the storage capacitor are respectively connected with the second power line, and the gate electrode of the first light emitting control transistor and the gate electrode of the second light emitting control transistor are respectively connected with the second power line.

5. The array substrate according to claim 4, wherein the first initialization signal line and the reset signal line at least partially do not overlap.

6. The array substrate according to claim 4, wherein, in a direction perpendicular to the base substrate, the first initialization signal line is located between the reset signal line and the second initialization signal line.

7. The array substrate according to claim 3, wherein the gate electrode of the driving transistor is connected to the second node, and the second initialization transistor is configured to provide the second initialization signal to the gate electrode of the driving transistor through the second node.

8. A display device, comprising the array substrate according to claim 1.

9. The array substrate according to claim 1, wherein the first connection line comprises:

a first sub-connection portion, extending in a second direction intersecting the first direction;

a second sub-connection portion, extending in the second direction; and a third sub-connection portion, extending in the first direction, wherein one end of the third sub-connection portion is electrically connected with the first sub-connection portion, and the other end of the third sub-connection portion is electrically connected with the second sub-connection portion, the first sub-connection portion is located at a first side of the display region in the first direction, the second sub-connection portion is located at a second side of the display region opposite to the first side in the first direction, and the third sub-connection portion is located at a side of the display region in the second direction, one end of the first initialization line is electrically connected with the first sub-connection portion, and the other end of the first initialization line is electrically connected with the second sub-connection portion.

10. The array substrate according to claim 1, wherein the plurality of pixel driving circuits form a plurality of pixel driving rows, each of the pixel driving rows comprises multiple pixel driving circuits arranged in the first direction, the plurality of pixel driving rows are arranged in a second direction intersecting the first direction, a plurality of first initialization signal lines are provided, and the plurality of first initialization signal lines are configured to apply first initialization signals to the plurality of pixel driving rows, the array substrate further comprises at least one interconnection line which extends in the second direction and is connected with the plurality of the first initialization signal lines.

11. The array substrate according to claim 10, wherein the plurality of pixel driving circuits form a plurality of pixel driving columns, each of the pixel driving columns comprises multiple pixel driving circuits arranged in the second direction, and the plurality of pixel driving columns are arranged in the first direction, the array substrate comprises a plurality of second power lines, and the plurality of second power lines are arranged corresponding to the plurality of pixel driving columns;

in a region corresponding to one pixel driving circuit, an overlapping area of an orthographic projection of the second power line on the base substrate and an orthographic projection of the interconnection line on the base substrate is less than 50% of an area of the orthographic projection of the interconnection line on the base substrate.

12. The array substrate according to claim 1, wherein the base substrate comprises a display region and a peripheral region around the display region, the pixel driving circuit and the light emitting element are located in the display region, and the first power line is located in the peripheral region, the first initialization line extends from the display region to the peripheral region and is directly connected with the first power line.

13. The array substrate according to claim 12, wherein the plurality of pixel driving circuits form a plurality of pixel driving rows, each of the pixel driving rows comprises multiple pixel driving circuits arranged in the first direction, the plurality of pixel driving rows are arranged in a second direction intersecting the first direction, a plurality of first initialization signal lines are provided, and the plurality of first initialization signal lines are configured to apply first initialization signals to the plurality of pixel driving rows, the array substrate further comprises at least one interconnection line which extends in the second direction and is connected with the plurality of the first initialization signal lines.

14. The array substrate according to claim 11, wherein each of the pixel driving circuits further comprises:

an anti-leakage transistor, wherein a first electrode of the anti-leakage transistor is electrically connected with the gate electrode of the driving transistor, and a second electrode of the anti-leakage transistor is connected to the second node.

15. The array substrate according to claim 14, wherein a material of an active layer of the anti-leakage transistor comprises an oxide semiconductor material.

16. The array substrate according to claim 15, wherein materials of an active layer of the first light emitting control transistor, an active layer of the second light emitting control transistor, an active layer of the compensation transistor, an active layer of the first initialization transistor, an active layer of the second initialization transistor, an active layer of the driving transistor and an active layer of the data writing transistor comprise silicon-based semiconductor materials.

17. The array substrate according to claim 15, further comprising:

a second gate line, a gate electrode of the anti-leakage transistor being connected with the second gate line, wherein the active layer of the anti-leakage transistor is located on a side of the second electrode plate away from the base substrate, and the first initialization line and the second gate line are arranged on a same layer and are located on a side of the active layer of the anti-leakage transistor away from the base substrate.

18. The array substrate according to claim 1, wherein the first initialization signal line is electrically connected to the second electrode of the first initialization transistor through a connection block, and the connection block is located on a side of the first initialization signal line away from the base substrate.

19. An array substrate, comprising:

a base substrate; and a plurality of pixel driving circuits, arranged in an array on the base substrate, wherein each of the pixel driving circuits comprises a driving transistor, a first light emitting control transistor, a compensation transistor, a first initialization transistor and a second initialization transistor, a first electrode of the first initialization transistor and a first electrode of the first light emitting control transistor are connected to a first node, and the first initialization transistor is configured to provide a first initialization signal to an anode of a light emitting element through the first node, a first electrode of the second initialization transistor and a first electrode of the compensation transistor are connected to a second node, and the second initialization transistor is configured to provide a second initialization signal to a gate electrode of the driving transistor through the second node, a second electrode of the first initialization transistor is configured to receive the first initialization signal, and a cathode of the light emitting element is configured to receive a first driving signal, and a difference between a potential of the first initialization signal and a potential of the first driving signal is less than 1.5V, wherein the potential of the first initialization signal and the potential of the first driving signal are the same, each of the pixel driving circuits further comprises a second light emitting control transistor, a storage capacitor and a data writing transistor, the array substrate further comprises a second power line, a data line, a first light emitting control line, a gate line and a reset signal line, a first electrode of the driving transistor, a second electrode of the first light emitting control transistor and a second electrode of the compensation transistor are connected to a third node, the gate electrode of the driving transistor is connected to a first electrode plate of the storage capacitor, a second electrode of the driving transistor, a first electrode of the data writing transistor and a first electrode of the second light emitting control transistor are connected to a fourth node, a gate electrode of the first initialization transistor and a gate electrode of the second initialization transistor are respectively connected with reset signal lines of two adjacent rows, the second electrode of the data writing transistor is connected with the data line, the gate electrode of the data writing transistor and the gate electrode of the compensation transistor are respectively connected with the gate line, the second electrode of the second light emitting control transistor and the second electrode plate of the storage capacitor are respectively connected with the second power line, and the gate electrode of the first light emitting control transistor and the gate electrode of the second light emitting control transistor are respectively connected with the second power line, each of the pixel driving circuits further comprises:

an anti-leakage transistor, wherein a first electrode of the anti-leakage transistor is electrically connected with the gate electrode of the driving transistor, and a second electrode of the anti-leakage transistor is connected to the second node, a material of an active layer of the anti-leakage transistor comprises an oxide semiconductor material, the array substrate further comprises a second gate line, a gate electrode of the anti-leakage transistor being connected with the second gate line, the active layer of the anti-leakage transistor is located on a side of the second electrode plate away from the base substrate, and the first initialization line and the second gate line are arranged on a same layer and are located on a side of the active layer of the anti-leakage transistor away from the base substrate.

* * * * *